United States Patent
Espallargas et al.

(10) Patent No.: US 11,697,880 B2
(45) Date of Patent: Jul. 11, 2023

(54) THERMAL SPRAYING OF CERAMIC MATERIALS COMPRISING METAL OR METAL ALLOY COATING

(71) Applicant: SERAM COATINGS AS, Oslo (NO)

(72) Inventors: Nuria Espallargas, Oslo (NO); Fahmi Mubarok, Oslo (NO)

(73) Assignee: SERAM COATINGS AS, Oslo (NO)

( * ) Notice: Subject to any disclaimer, the term of this patent is extended or adjusted under 35 U.S.C. 154(b) by 70 days.

(21) Appl. No.: 16/325,614

(22) PCT Filed: Aug. 16, 2017

(86) PCT No.: PCT/EP2017/070779
§ 371 (c)(1),
(2) Date: Feb. 14, 2019

(87) PCT Pub. No.: WO2018/033577
PCT Pub. Date: Feb. 22, 2018

(65) Prior Publication Data
US 2019/0211434 A1    Jul. 11, 2019

(30) Foreign Application Priority Data

Aug. 16, 2016 (GB) .................................... 1614008

(51) Int. Cl.
*B22F 1/18* (2022.01)
*B32B 5/16* (2006.01)
(Continued)

(52) U.S. Cl.
CPC ................ *C23C 4/10* (2013.01); *B22F 1/148* (2022.01); *B22F 1/17* (2022.01); *C04B 35/563* (2013.01);
(Continued)

(58) Field of Classification Search
CPC ... C04B 14/323; C04B 14/324; C04B 14/327; C04B 14/328; C04B 18/02; C04B 20/1062; C04B 2235/5436; B22F 1/18; C23C 14/18; C23C 8/02; C23C 30/00; Y10T 428/2991; Y10T 428/12139
See application file for complete search history.

(56) References Cited

U.S. PATENT DOCUMENTS

| 4,676,967 | A | 6/1987 | Breneman |
| 4,814,128 | A | 3/1989 | Lieberman et al. |

(Continued)

FOREIGN PATENT DOCUMENTS

| CN | 101054299 | | 10/2007 |
| CN | 101180415 | A | 5/2008 |

(Continued)

OTHER PUBLICATIONS

Translation JP 2002-097578 (Year: 2002).*
(Continued)

*Primary Examiner* — Hoa (Holly) Le
(74) *Attorney, Agent, or Firm* — Thomas|Horstemeyer LLP

(57) ABSTRACT

A process comprising: (i) coating particles of silicon carbide, silicon nitride, boron carbide or boron nitride with a metal alloy or metal layer; (ii) agglomerating the particles of step (i); thermally spraying the agglomerated metal or metal alloy coated particles onto a substrate to provide a coating thereon.

23 Claims, 6 Drawing Sheets

(51) Int. Cl.

| | | |
|---|---|---|
| *C23C 4/10* | (2016.01) | |
| *C04B 35/628* | (2006.01) | |
| *C23C 4/134* | (2016.01) | |
| *C04B 35/565* | (2006.01) | |
| *C04B 35/622* | (2006.01) | |
| *C23C 18/18* | (2006.01) | |
| *C23C 18/34* | (2006.01) | |
| *C23C 4/06* | (2016.01) | |
| *C04B 35/583* | (2006.01) | |
| *C23C 18/16* | (2006.01) | |
| *C04B 35/563* | (2006.01) | |
| *C23C 18/08* | (2006.01) | |
| *C23C 18/12* | (2006.01) | |
| *C04B 35/584* | (2006.01) | |
| *C23C 18/36* | (2006.01) | |
| *B22F 1/17* | (2022.01) | |
| *B22F 1/148* | (2022.01) | |
| *C04B 35/626* | (2006.01) | |
| *C23C 18/32* | (2006.01) | |

(52) U.S. Cl.
CPC .......... *C04B 35/565* (2013.01); *C04B 35/583* (2013.01); *C04B 35/584* (2013.01); *C04B 35/62222* (2013.01); *C04B 35/62645* (2013.01); *C04B 35/62695* (2013.01); *C04B 35/62842* (2013.01); *C04B 35/62886* (2013.01); *C23C 4/06* (2013.01); *C23C 4/134* (2016.01); *C23C 18/08* (2013.01); *C23C 18/1216* (2013.01); *C23C 18/1245* (2013.01); *C23C 18/1295* (2013.01); *C23C 18/1635* (2013.01); *C23C 18/1689* (2013.01); *C23C 18/1692* (2013.01); *C23C 18/1696* (2013.01); *C23C 18/1886* (2013.01); *C23C 18/1893* (2013.01); *C23C 18/32* (2013.01); *C23C 18/34* (2013.01); *C23C 18/36* (2013.01); *B22F 2999/00* (2013.01); *C04B 2235/3826* (2013.01); *C04B 2235/405* (2013.01); *C04B 2235/5436* (2013.01)

(56) References Cited

U.S. PATENT DOCUMENTS

| | | | |
|---|---|---|---|
| 5,098,740 A | 3/1992 | Tewari | |
| 5,122,182 A * | 6/1992 | Dorfman | C23C 4/06 428/323 |
| 5,227,345 A * | 7/1993 | Howard | C04B 35/5611 428/404 |
| 5,229,339 A | 7/1993 | Pujari et al. | |
| 5,302,450 A | 4/1994 | Rao et al. | |
| 5,352,269 A | 10/1994 | McCandlish et al. | |
| 5,706,999 A | 1/1998 | Lim et al. | |
| 6,025,034 A | 2/2000 | Strutt et al. | |
| 6,745,951 B2 | 6/2004 | Barykin et al. | |
| 7,976,941 B2 | 7/2011 | Lodyga et al. | |
| 9,662,711 B2 | 5/2017 | Miyashita et al. | |
| 2004/0142196 A1 | 7/2004 | Hajmrle et al. | |
| 2004/0258916 A1 | 12/2004 | Tului et al. | |
| 2005/0155454 A1* | 7/2005 | Fiala | C23C 4/08 75/252 |
| 2006/0121068 A1 | 6/2006 | Sane et al. | |
| 2006/0213326 A1* | 9/2006 | Gollob | C23C 4/04 427/446 |
| 2011/0052803 A1 | 3/2011 | Bao et al. | |
| 2012/0295825 A1* | 11/2012 | Dorfman | C22C 32/0068 508/151 |
| 2013/0034712 A1* | 2/2013 | Kudoh | C04B 35/6261 428/216 |
| 2014/0170312 A1 | 6/2014 | Liu | |
| 2015/0004890 A1 | 1/2015 | Krstic et al. | |
| 2017/0121230 A1 | 5/2017 | Zhang et al. | |

FOREIGN PATENT DOCUMENTS

| | | | |
|---|---|---|---|
| CN | 101259532 | | 9/2008 |
| CN | 103816895 A | | 5/2014 |
| EP | 210614 | | 7/1986 |
| JP | S5761664 | | 4/1982 |
| JP | 61243164 | | 4/1985 |
| JP | 60141876 | | 7/1985 |
| JP | 63-169371 | | 7/1988 |
| JP | H03115578 | | 5/1991 |
| JP | 03218957 | | 9/1991 |
| JP | 05320923 | | 12/1993 |
| JP | 11-286768 | | 10/1999 |
| JP | 2002097578 A | | 4/2002 |
| JP | 2004137482 | | 5/2004 |
| JP | 2009-029602 | | 2/2009 |
| JP | 2011-178643 | | 9/2011 |
| JP | 2012193442 | | 10/2012 |
| WO | 2002075004 | | 9/2002 |
| WO | 2003004718 | | 1/2003 |
| WO | 2010003035 | | 1/2010 |
| WO | 2013033497 | | 3/2013 |
| WO | 2014068082 | | 5/2014 |
| WO | WO-2016077213 A1 * | 5/2016 | ............. B22F 1/025 |
| WO | WO-2018107846 A1 * | 6/2018 | |

OTHER PUBLICATIONS

Translation copy of WO2018107846A1 (Year: 2018).*
Chromik, R. et al., "Erosive wear behavior of a WC—Ni composite coating deposited by cold spray" (abstract), International Thermal Spray Conference 2015, Long Beach, California, May 11-14, 2015.
Richert, M.W., "The wear resistance of thermal spray the tungsten and chromium carbides coatings," 2011, J. Achiev. in Materials and Mnufacturing Eng., 47:177-184.
Written Opinion for PCT/EP2017/070779 dated Nov. 30, 2017 (9pp).
Vuoristo et al., "Surface changes in thermally sprayed hard coatings by wear of different abrasive," Thermal Spray 2004: Advances in Technology and Applications, ASM International, 6pp.
European Search Report for 18179170.8 dated Sep. 24, 2018 (10pp).
Djuricic, B. et al., "Study of Particle Coatings for the Design of Intergranular Phases in Engineering Ceramics," 1995, Silicone Industriels, 7-8:203-210.
Garg, A.K. et al., "Microencapsulation of silicon nitride particles with yttria and yttria-alumina precursors," 1990, J. Mater. Res., 5:136-142.
Padture, N.P. et al., "Enhanced Machinability of Silicon Carbide via Microstructural Design," 1995, J. Am. Ceram. Soc., 78:215-217.
Search Report for Eurasian Patent Application 2420-549890 dated Nov. 6, 2018 (4pp, no translation available).
Ge, M. et al., "Preparation of Superfine Powder Surface Encapsulating film," Collected Papers for the Fourth Session of National Academic Conference for Preparation and Treatment of Particles, Nov. 30, 1995, p. 83-86 (English translation).
English translation of office action for Japanese patent application 2015-540136 dated Nov. 28, 2017.
International Search Report and Written Opinion for PCT/EP2013/072861 dated Nov. 11, 2014.
Wielage, J. et al., International Thermal Spray Conference 2002, E. Lugscheider, ed., Dusseldorf, Germany: DVS-ASM International, 2002, 1047-1051.
Search Report for Great Britain application No. GB1614008.9 dated Feb. 17, 2017 (10pp).
International Search Report for PCT/EP20177070779 dated Nov. 30, 2017 (4pp).
U.S. Appl. No. 14/438,933, filed Apr. 28, 2015, Espallargas et al., WO2014068082.

* cited by examiner

THERMAL SPRAYING OF CERAMIC MATERIALS COMPRISING METAL OR METAL ALLOY COATING

This invention relates to a process for thermally spraying metal or metal alloy coated silicon or boron carbide or metal or metal alloy coated silicon or boron nitride particles onto a substrate so as to provide valuable substrates coated with these ceramics. The invention also relates to a process for making these metal or metal alloy coated ceramics with sufficiently thick metal layers so that the layers are capable of protecting the ceramic particle core during the thermal spraying operation. The coated particles themselves form a still yet further aspect of the invention along with articles coated using the process of the invention.

BACKGROUND

Silicon and boron carbide and nitride-based materials have been widely used in many industries due to their excellent combination of mechanical, thermal and chemical properties. These carbides and nitrides offer very good tribological properties and corrosion resistance and thus are generally used in coating applications requiring wear and abrasive resistance, e.g. in a corrosive environment. They compare favourably with more expensive materials such as diamond in terms of these properties.

Silicon carbide, for example, is widely used as protective coating in industrial applications such as in aerospace moving components, metal working tools and petrochemical systems. This has made these ceramics an attractive synthetic target for scientists.

Most silicon and boron carbide and nitride coatings are generally deposited onto a substrate by vacuum deposition techniques such as physical vapour deposition (PVD) or chemical vapour deposition (CVD). These methods are expensive, time consuming, and limited to small articles which fit into the deposition chamber. The methods often require complex processing conditions and lead to coatings with very limited thickness (i.e. ranging from nanometers to less than 100 micrometers).

Thermal and kinetic spray processes have been generally accepted as one of the most effective and economic methods for producing metallic and ceramic coatings on small to large scale components. In addition, thermal spray processes do not require the use of vacuum chambers and can produce coatings with thickness ranging from very few tens of micromenters to few millimetres. However, these methods are not always suitable for depositing ceramic carbides or nitrides due to decomposition or sublimation of metal and carbide species at the temperatures and atmospheres necessary to thermally spray them (sublimation at around 2500° C. and decomposition also around 2500° C. in the presence of oxygen). This is true for the cases of silicon and boron carbides and their nitrides.

Covalent bonded compound carbides such as silicon carbide and boron carbide are thus not commonly available for thermal spraying due to their tendency to decompose at elevated temperatures during atmospheric thermal spraying processes. Chemically bonded nitride based coatings such as silicon nitride, boron nitride and titanium nitride are also considered challenging materials for thermal spraying for the same reasons as for carbides.

It would therefore be valuable to devise ways of thermally spraying these important covalent bonded ceramic materials.

It is known that SiC can be thermally sprayed when combined with particles of a metal oxide. One method involves the mechanical mixing of silicon carbide with aluminium oxide and yttrium oxide powder, as described in WO2003/004718. Other methods provide particles of SiC with a metal oxide layer on the particle. This can be achieved for example by chemical precipitation of yttrium aluminium garnet (YAG) onto silicon carbide particles followed by spray drying, to provide SiC particles with a YAG layer, as described in WO2014/068082.

However, oxide-coated particles of SiC are limited due to their ceramic brittle nature. These coatings are well suited for applications against wear involving compression, sliding and rolling, especially at elevated temperatures. However, metal oxide coated SiC particles are not suitable for certain applications, such as where a bending or plastic deformation of the substrate is present. It would therefore be advantageous to provide SiC particles with a metallic matrix to produce thermal spray coatings for those applications where metal oxide coated SiC particles are not suitable.

In order to prepare suitable particles of SiC and other covalent bonded ceramic materials with a metallic layer it is also necessary to sinter them. Ensuring a homogenous distribution of the metallic layer is key to ensuing the production of a good particulate product for further thermal spraying.

In order to preserve the ceramic particles during the thermal spraying process, the present inventors propose a metal or metal alloy film covering the individual particles, thus avoiding their decomposition and evaporation during thermal spraying process. Previous uses of metals in attempts to enable thermal spraying of these covalently bonded ceramic materials have not involved a layer acting as a coating on the individual SiC particles.

Thermal spraying of ionic bonded carbides such as tungsten carbide (WC) and chromium carbide ($Cr_3C_2$) has been applied in industries for wear and erosion protection. (M. W. Richert, *The Wear resistance of thermal spray the tungsten and chromium carbides coatings, J. of Achievements in Materials and Manufacturing Engineering*, Vol 27 (2) 2011 p 177-184) and (P. Vuoristo, J. Laurila, T. Mantyla, *Surface changes in thermally sprayed hard coatings by wear of different abrasive, Thermal Spray* 2004: *Advances in Technology and Applications, ASM International*, p 1046-1051). These carbides are usually mixed with a metal matrix to enable the thermal spraying process.

Several attempts had been made to produce metal matrix based silicon carbide. The most general method is by mechanical mixing of a metal powder with silicon carbide powder, as described in Wielage, J. et al, *International Thermal Spray Conference* 2002, E. Lugscheider, eds., Düsseldorf, Germany: *DVS-ASM International*, (2002), pp. 1047-1051. The metal and ceramic components of this process are produced as separate phases within the blend (i.e. a dispersion of SiC particles in a metallic matrix), rather than as particles of SiC having a metallic layer, making it difficult to thermally spray the particles without any decomposition of the ceramic phase.

One problem with the formation of a layer on a particle is the adhesion between the ceramic and the metal layer since they both have different composition. The present invention provides a solution to this problem.

The present inventors seek to avoid the problems of decomposition and sublimation of the ceramic material by encapsulating the ceramic in a metal or metal alloy phase. The inventors have devised processes for the formation of metal coated ceramic particles and shown that these can be thermally sprayed without decomposition or sublimation of the core ceramic particle. The process of the invention therefore opens the door to the production of SiC type coatings on a wide variety of substrates.

It is a further object of the present invention to provide a method for forming silicon and boron carbide or nitride coatings on a substrate using thermal spray apparatus.

SUMMARY OF INVENTION

Figure 1:
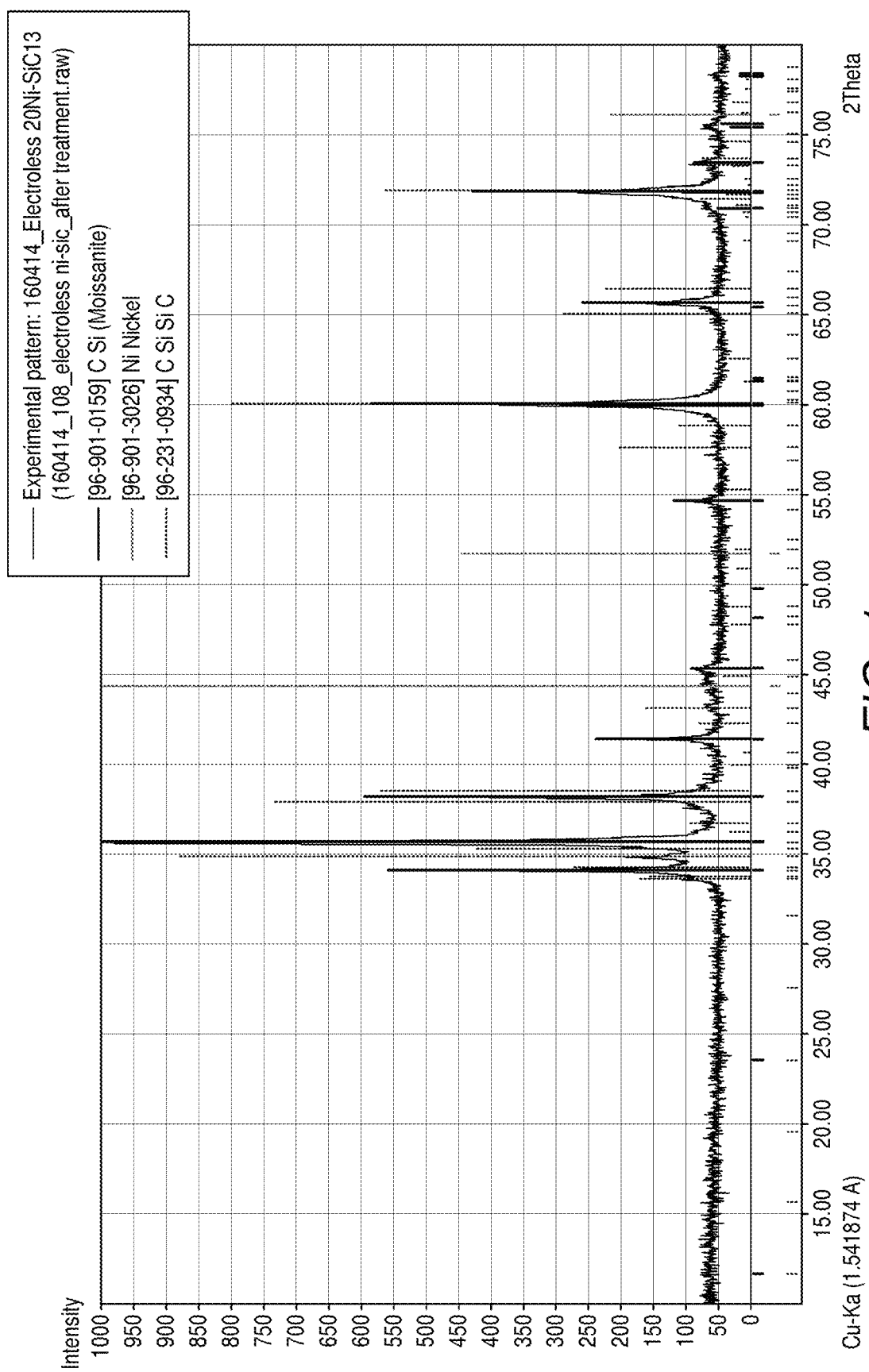
FIG. 1 illustrates XRD peaks observed for SiC particles (0.8 μm average size) which have undergone electroless nickel plating without any pre-treatment.

Viewed from one aspect the invention provides a process comprising:
(i) coating particles of silicon carbide, silicon nitride, boron carbide or boron nitride with a metal alloy or metal layer;
(ii) agglomerating the particles of step (i);
(iii) thermally spraying the agglomerated metal or metal alloy coated particles onto a substrate to provide a coating thereon.

Viewed from another aspect the invention provides a plurality of metal or metal alloy coated particles comprising:
(i) 50-95 wt % of an inner core of silicon carbide, silicon nitride, boron carbide or boron nitride; and
(ii) 5-50 wt % of an outer layer of a metal or metal alloy.

Viewed from another aspect the invention provides a feedstock for thermal spraying comprising a plurality of metal or metal alloy coated particles as hereinbefore defined.

Viewed from another aspect the invention provides a process for the production of metal or metal alloy coated particles, comprising the steps of:
(i) treating particles of silicon carbide, silicon nitride, boron carbide or boron nitride to provide nucleating sites on the surface of the particles;
(ii) providing a layer of metal or metal alloy on the particles of step (i) to provide metal-coated or metal-alloy coated particles;
(iii) spray-drying the metal-coated or metal-alloy coated particles to produce an agglomerated particulate comprising metal-coated or metal-alloy coated particles; and optionally
(iv) heat treating the agglomerated particulate.

Viewed from another aspect the invention provides a process for the production of metal or metal alloy coated particles, comprising the steps of:
(i) treating particles of silicon carbide, silicon nitride, boron carbide or boron nitride to provide nucleating sites on the surface of the particles;
(ii) providing by electroplating, e.g. electroless plating a layer of metal or metal alloy on the particles of step (i) to provide metal-coated or metal-alloy coated particles;
(iii) spray-drying the metal-coated or metal-alloy coated particles to produce an agglomerated particulate comprising metal-coated or metal-alloy coated particles; and optionally
(iv) heat treating the agglomerated particulate.

In a further embodiment, a process of the invention comprises thermally spraying the metal or metal alloy coated particles of the invention or thermally spraying the metal coated or metal alloy coated particles formed by a process of the invention onto a substrate. Such a thermal spraying process may occur after step (iii) or step (iv) as hereinbefore defined.

Viewed from another aspect the invention provides a process for the production of metal or metal alloy coated particles, comprising the steps of:
(i) obtaining particles of silicon carbide, silicon nitride, boron carbide or boron nitride coated with at least one metal oxide layer;
(ii) reducing the metal oxide coated particles to form particles of silicon carbide, silicon nitride, boron carbide or boron nitride coated with a metal or metal alloy layer.

Viewed from another aspect the invention provides a process for the production of metal or metal alloy coated particles, comprising the steps of:
(i) obtaining particles of silicon carbide, silicon nitride, boron carbide or boron nitride coated with at least one metal oxide layer;
(ii) agglomerating the particles by heating;
(iii) reducing the agglomerated metal oxide coated particles to form particles of silicon carbide, silicon nitride, boron carbide or boron nitride coated with a metal or metal alloy layer.

Viewed from another aspect the invention provides a process for the production of metal or metal alloy coated particles, comprising the steps of:
(i) suspending ceramic particles in an aqueous solution of a fuel and at least one metal salt having an oxidizing counterion to provide a mixture;
(ii) heating the mixture to a temperature below its ignition temperature to remove at least a part of the water; and
(iii) heating at least a portion of the mixture to its ignition temperature to provide metal or metal alloy coated ceramic particles;
(iv) spray-drying the metal-coated ceramic particles to produce an agglomerated particulate of ceramic particles; and
(v) heat treating the agglomerated particulate.

Viewed from another aspect the invention provides a process for the production of metal coated particles, comprising the steps of:
(i) precipitating one or more metal salts on the surface of a silicon carbide, silicon nitride, boron carbide or boron nitride particle and subsequently oxidising said precipitated salts to form a metal oxide layer on said ceramic particle;
(ii) spray-drying the metal oxide coated ceramic particles to produce an agglomerated particulate of ceramic particles; and
(iii) reducing the metal oxide layer to a metal or metal alloy layer.

Viewed from another aspect the invention provides a process for providing a substrate with a coating of silicon carbide, boron carbide, silicon nitride or boron nitride, comprising thermally spraying metal-coated or metal alloy coated particles of the invention on a substrate.

Viewed from another aspect the invention provides an article which has a ceramic-metallic coating thereon applied by a thermal spraying process according to the invention.

Viewed from another aspect the invention relates to the use of metal or metal alloy coated ceramic particles as herein defined for thermally spraying onto a substrate.

DEFINITIONS

The term "thermal spraying" is used herein to cover either spraying using a combustion thermal spraying process (such a high velocity oxygen fuel), a detonation thermal spraying process (such as high frequency pulse detonation), or an electrical/plasma thermal spraying process (such as atmospheric plasma spray). These techniques are not new and are familiar to workers in this field.

The term "ceramic" is used herein to cover silicon carbide, boron carbide, silicon nitride or boron nitride, unless context permits otherwise.

The term "metal" in the context of the metal coating refers to a single essentially pure metal. Alloys are formed from the combination of two or more different metals as defined herein.

The term "matrix" used herein refers to a solid material in which the coated ceramic particles of the invention are dispersed. The coating itself provides a matrix in the thermally sprayed coating.

The term "powder feedstock" is used to cover a composition comprising the ceramic particles of the invention suitable for thermal spraying.

All percentages refer to percentage by weight unless otherwise specified.

DETAILED DESCRIPTION OF INVENTION

This invention relates to silicon carbide (SiC), boron carbide ($B_4C$), silicon nitride ($Si_3N_4$) and boron nitride (BN) ceramic particles coated with a metal or metal alloy layer to enable their application onto a substrate via thermal spraying without sublimation or decomposition of the core ceramic. Whilst the invention will generally be described herein with reference to the term ceramic particles, this will be taken to mean silicon carbide, silicon nitride, boron nitride or boron carbide, preferably silicon carbide (SiC), boron carbide ($B_4C$), or silicon nitride ($Si_3N_4$) ceramic particles. The use of Si in the ceramic and most especially the use of SiC is the most preferred option. Ceramic cores preferably consist of the material in question.

The metal or metal alloy layer which is applied in this invention onto the individual ceramic particles is thick enough to allow thermal spraying of the particles by protecting the core but of course, the layer will also act as a wetting agent that melts during the spraying process holding all the ceramic particles together to form a mechanically consistent thermally sprayed coating. The metal or metal alloy layer provides high cohesive strength between particles before thermal spraying. Also, the metal or metal alloy layer provides a matrix phase that bonds ceramic particles together on a substrate after spraying. Conventionally, separate metal particles can be added by mechanically mixing them with the ceramic phase to form a metal matrix in which the ceramic particles are held. In our invention, the coating on the individual particles will act as the metal matrix. A ceramic-metallic coating is called "cermet" in thermal spraying. The ceramic particles embedded in a metal matrix leading to the coating. Typically the metal matrix is between 10-25 wt % of the coating.

Particles

In one aspect the invention provides metal-coated or metal alloy coated ceramic particles, each particle having a ceramic core with a layer of a metal or metal alloy. The ceramic core preferably forms 50-95 wt % of the particles, preferably 60-95 wt % of the particles, such as 65-90 wt % or 70-85 wt % of the particles. The metal or metal alloy coating forms 5-50 wt % of the particles, preferably 5-40 wt % of the particles, such as 10-35 wt % or 15-30 wt % of the particles.

The ceramic core of each particle has an average diameter of 50 to 5000 nm, such as 200 to 5000 nm, especially 400 to 3500 nm. The average diameter of the ceramic core prior to applying the coating can be measured by conventional methods known in the art, e.g. a coulter counter, and it is assumed that the average particle size of the ceramic core of the coated particles is equal to that of the ceramic core prior to coating. The metal or metal alloy layer may increase the core particle diameter by 200 to 300 nm.

As will be described in subsequent sections, the methods of the invention allow for the production of particles in which the metal or metal alloy layer is directly bonded to the ceramic. It is therefore preferred that there is no additional layer between the metal or metal alloy layer and the ceramic. It may be however that the starting ceramic particle is partially oxidised and thus contains an oxide coating through a natural oxidation process. Whilst such an oxide is preferably removed, it may also remain.

Preferably the metal or metal alloy layer is the outermost layer, i.e. the particles consist essentially of only the inner core of ceramic and an outer layer of metal or metal alloy.

A metal coating comprises one metal. Especially preferred are all transition metals such as chromium, titanium, cobalt, iron, copper, vanadium, tungsten, molybdenum, niobium, silver and tantalum, especially $1^{st}$ row transition metals. Nickel is also interesting. Other metals of interest include those of the groups XIII to XV in the periodic table of the elements such as aluminium and tin.

A metal alloy coating comprises two or more metals. Suitable metals include all transition metals such as chromium, titanium, cobalt, iron, copper, vanadium, tungsten, molybdenum, niobium, silver and tantalum. Nickel is also of interest. Other metals of interest include those of the groups XIII to XV in the periodic table of the elements such as aluminium and tin.

In a metal alloy, one of these metals can be alloyed with one or more other metals from the previous list or may be alloyed with one or more of boron, silicon, carbon and phosphorus as alloying elements.

Preferred metal alloys and metals are NiCo, NiCr, NiSi, NiWP, FeSi, CoSi, NiTiCr, NiTiCrBSi, NiB, Co, CoCr, Fe and FeCr. It is especially preferred that the metal coating is Ni or the metal alloy comprises Ni.

Especially preferred metal layers are based on Ni, Co, Cr, Fe and Al, such as Ni, Co, Fe and Al. Preferred alloys comprise one or more of Ni, Co, Cr, Fe and Al, such as one or more of Ni, Co, Cr, Fe and Al.

In theory, the coating may comprise two or more distinct layer of metals. Alternatively, there might be two or more alloy layers or one or more alloy layer and one or more metal layers. It is preferred if a single metal layer or metal alloy layer is used.

The metal or metal alloy coating has an average thickness of 50 to 300 nm, such as 75 to 150 nm. The thickness of this layer can be measured, for instance, by fracturing the coated particles and measuring the thickness of the coating by microscopic methods.

Process

The invention provides several processes for preparing the ceramic particles of the invention, the method involving providing a layer of metal or metal alloy on a ceramic particle.

The processes of the invention begin with particles of the ceramic. The particle size is typically of the order of 50 nm to 5000 nm such as 200 nm to 5000 nm, preferably 400 to 3500 nm. The particles are preferably not agglomerated at this stage. The particles are preferably free flowing and therefore powder like or in the form of stable suspension (e.g. in water). These particles are well known and can be bought on the open chemical market. These particles cannot however be directly thermally sprayed as they would decompose and sublime at the temperatures to which the particles would be exposed during the spraying process. Even sintered SiC cannot generally be thermally sprayed. It is generally considered challenging to adhere a coating to these particles.

The inventors provide a sufficiently thick metal or metal alloy layer on the ceramic particles that prevents the decomposition or sublimation of the coated ceramic particle during thermal spraying. The coating may also act as a sintering aid.

Once coated, the particles are agglomerated and heat treated and it is the agglomerate and heat treated particles that can be thermally sprayed.

Method—Electroless Plating

In a first embodiment a metal or metal alloy coating is provided on the ceramic particles by electroless plating. Whilst this process can be carried out directly, it is preferred if the ceramic particles are pre-conditioned in order to enhance the adhesion of the metal or metal alloy coating to the particles. It will be appreciated that steps (ii)-(iv) described below are numbered assuming that a pre-conditioning step (i) is carried out. If this step is omitted then the procedures described below as steps (ii) to (iv) would become steps (i) to (iii) of the process.

In a first method, particles of the invention can be prepared by a method comprising the steps of:
(i) treating particles of a ceramic material selected from silicon carbide, silicon nitride, boron carbide or boron nitride to provide nucleating sites on the surface of the ceramic material;
(ii) providing a layer of metal or metal alloy on the ceramic material to provide metal or metal alloy coated ceramic particles;
(iii) spray-drying the metal-coated or metal-alloy coated particles to produce an agglomerated particulate comprising metal-coated or metal-alloy coated particles; and optionally
(iv) heat treating the agglomerated particulate.

The heat treatment step ideally densifies the metal or metal alloy coating.

Step (i)—Pre-Treatment to Provide Nucleating Sites

Commercially available ceramic particles typically comprise a thin layer of oxide on their surface. It is challenging to adequately adhere a metal or metal alloy layer to the ceramic particle when an oxide layer is present on the surface of the ceramic. The inventors have now established that it is possible to adequately adhere a metal or metal alloy coating to the particles by providing nucleating sites on the surface of the ceramic optionally after etching of the oxide.

Typically, in a first step (i)(a), the ceramic particles are pre-treated to remove any surface oxide layer and in a second step (i)(b) nucleating sites are provided on the surface of the ceramic material.

Step (i)(a) can be achieved by suspending the particles in an aqueous solution of a strong acid such as HF. The conditions are such that the oxide layer is etched away. As a first step therefore, it is preferred if any oxide layer present on the ceramic particles is removed by any means. Preferably, the oxide layer is removed by etching with strong acid.

Preferably the particle suspension is sonicated, preferably ultrasonicated, for at least part of the duration of the process.

The use of HF is preferred for this step. The particles may be contacted with the acid for 5-60 minutes, preferably for 10-30 minutes. The reaction may occur at ambient temperature although some variation around room temperature (e.g. around 10-40° C.) is permitted. The particles can then be filtered.

In one embodiment, the HF can be combined with another strong acid such as nitric acid. In another embodiment, the HF can be combined with benzotriazole or benzotriazole and nitric acid to form the treatment solution.

Following step (i)(a), a step (i)(b) is carried out in which nucleating sites are provided on the surface of the ceramic. This step could be carried out directly on the ceramic particles in a less desirable embodiment.

It has been found that this step improves subsequent adhesion between the ceramic and the metal or metal alloy layer.

In step (i)(b), the ceramic particles are preferably treated sequentially with solutions of Sn(II) and Pd(II) or simultaneously with Sn(II) and Pd(II) ions. The particles are preferably first dispersed in an aqueous solution of Sn(II). Such exposure may last for a period of 10 min at a temperature of 25° C. The concentration of Sn(II) ions is preferably in the range of 0.01 to 0.5 M, such as 0.01 to 0.1 M, such as 0.02 to 0.1 M. The counterion to Sn(II) is not particularly important, but in one embodiment $SnCl_2$ is preferred. The particles may then be filtered.

After treatment with Sn(II), the particles are preferably dispersed in an aqueous solution of Pd(II). This exposure may last for a period of 10 hours at a temperature of 25° C. The concentration of Pd(II) ions is preferably in the range of 0.0005 to 0.01 M. such as 0.0005 to 0.005 M, such as 0.001 to 0.005 M. The counterion to Pd(II) is not of particular importance, but in one embodiment $PdCl_2$ is preferred. The particles may then be filtered.

Without wishing to be limited by theory, we suggest that this method results in the formation of nucleation sites on the ceramic particles where metal or metal alloy atoms can, if necessary, reduce from the metal salt and form a coating that can grow.

It is preferred to carry out the oxide removal step (i) a as described above however in an alternative embodiment, this oxide etch step is omitted.

Where the oxide etching step is omitted it is preferred if the ceramic particles are first treated with a charged polyelectrolyte such as with poly(allylamine hydrochloride) (PAH). The polyelectrolyte can be positively or negatively charged, preferably positively charged.

The Mw of the polyelectrolyte is not especially critical. Values of 30 to 80,000 are possible. A commercially available PAH material having a Mw of ~58,000 (Aldrich) can be used. During this process the ceramic particles can be dispersed in water and sonicated in the presence of the polyeletrolyte.

The pH during the polyelctrolyte contact may be kept around pH 6-7, preferably pH 6.5. This can be achieved for instance by monitoring the pH and adding a base such as NaOH to keep the pH within predetermined levels. The particles may then be filtered.

Following treatment of the ceramic particles with the polyelectrolyte, the treated particles can then be subject to a nucleation procedure once more. The Sn/Pd procedure above is suitable however in this embodiment, a preferred option is to use a solution of Pd(II) such as PdCl2 or Na2PdCl4 to provide nucleating sites on the surface of the particles. Conditions may be the same as the Pd contact step discussed above. Thus, where a polyelectrolyte is used a Sn contact step can be avoided.

After step (i) has been carried out, the resulting ceramic particles have been activated by the inclusion of nucleation sites on the surface of the particle. These provide sites on which the metal or metal alloy layer can grow.

Step (ii)—Electroless Plating

In step (ii) the ceramic particles having nucleating sites on their surface formed in step (i), are subjected to electroless plating to form a metal or metal alloy layer on the surface of the ceramic particle. Electroless plating techniques are well known in the art and the choice of plating technique is not especially limited. Typically, a plating solution will comprise a solution of the desired metal ions. Plating occurs via reduction of the metal ions present.

In one preferred embodiment the metal or metal alloy layer formed in step (ii) comprises or consists of Nickel. A plating procedure typically involves the preparation of an aqueous solution of metal ions in a plating bath. In a preferred embodiment, a plating procedure typically involves the preparation of an aqueous solution of Ni(II) in a plating bath. A metal (or Ni(II)) concentration in the range of 0.01 to 0.5 M, such as 0.05 to 0.2 M is particularly suitable. The source of metal ions may be any suitable soluble salt, preferably nickel (II) sulphate or nickel (II) chloride.

Additives such as sodium hypophosphite (NaH2PO2), sodium citrate, sodium acetate, sodium glycolate and boric acid may also be included in plating solutions. Some exemplary plating solutions, which should not be seen as limiting the invention, are:
  a. 0.1 M Nickel Sulphate (NiSO4·6H2O), 0.19 M Sodium hypophosphite (NaH2PO2), 0.08 M Sodium citrate (Na3C6H5O7·2H2O) and 0.06 M Sodium acetate (NaAc);
  b. 0.11 M Nickel Sulphate (NiSO4·6H2O), 0.38 M Sodium hypophosphite (NaH2PO2), 0.24 M Sodium citrate (Na3C6H5O7·2H2O) and Boric Acid (H3BO3);
  c. 0.13 M Nickel chloride, (NiCl2·6H2O), 0.10 M Sodium hypophosphite (NaH2PO2·H2O) and 0.50 M Sodium glycolate (CH2OHCOONa)

The pH of the plating solution is preferably managed to a pH of 9-12, e.g. by addition of a base such as NaOH. The ceramic particles can be added at any stage in the process but preferably they are added after the electroplating solution has been prepared. The suspension of particles in basic metal solution may then be heated until the desired thickness of metal or metal alloy layer has been deposited on the ceramic particles. Preferably this step is carried out at a temperature in the range of 60-90° C. The duration can be adjusted depending on the desired thickness of metal layer to be deposited. A period of 30 to 120 mins may be suitable. Once the plating is complete, the coated particles may be collected by filtration.

If it is desired to produce a metal alloy coating in step (ii) then the aqueous plating composition can be varied by including addition metal salts in the plating solution.

Step (iii)—Agglomeration

In step (iii) the metal or metal alloy coated ceramic particles formed during step (ii) are agglomerated using conventional techniques (e.g. spray drying). The coated particles which form at this stage tend to agglomerate and can form an agglomerated particulate. Such an agglomerate may have a particle size of 5 microns or more such as 10 microns or more, such as in the range of 10-100 µm. Agglomeration can be achieved through various methods known in the art such as spheroidising, crushing, blending or spray drying. Most preferably the particles formed during step (ii) are agglomerated by spray drying in step (iii).

In one embodiment, the invention provides:
an agglomerate of a plurality of metal or metal alloy coated particles comprising:
  (i) 50-95 wt % of an inner core of silicon carbide, silicon nitride, or boron carbide; and
  (ii) 5-50 wt % of an outer layer of a metal or metal alloy preferably comprising Ni, Co, Cr, Fe and Al;
said agglomerate having a particle size of 5 microns or more, especially 10 microns or more.

Agglomerated powders of the invention may be collected in size ranges, for example 5-30 microns or 15-45 microns.

Before agglomeration, e.g. before spray drying, binders (additives) may be added as is known in the art to ensure successful drying processes. Polyvinyl alcohol (PVA) might be added to assist agglomeration to create round shaped powder. PEG might be added to increase the flowability of suspension preventing the clogging of the spray-drying nozzle and allowing easy transfer of the spray-dried powder and so on.

Step (iv)—Heat Treatment

After step (iii) the agglomerated particles are preferably subjected to heat treatment. A temperature of up to 500° C. may be employed, such as 350 to 500° C. The atmosphere in the furnace can be controlled to minimise side reactions. For example, the heat treatment may take place under argon or nitrogen atmosphere. When agglomerating and heat treating, a preferred target is to obtain a tap density of at least 1.5, preferably above 2 g/cm$^3$.

This step increases the cohesion between particles and also removes organic binders (e.g. from the spray drying process), leading to a dense agglomerated powder feedstock. The particles have the properties described under the preceding "particles" section. It is especially preferred if these particles are spherical.

These particles may then be thermally sprayed as defined below.

In an alternative embodiment, the metal or metal alloy layer is prepared by reduction of a metal oxide layer on the particles or via a solution combustion process.

The route to the achievement of the metal oxide layer is not limited. That metal oxide layer may be introduced by a sol-gel method or introduced via precipitation. In one embodiment, a metal oxide layer is introduced following the disclosure in WO2014/068082.

Note, however that the oxide layer required in this embodiment has to be sufficiently thick that when it is reduced it forms a metal or metal alloy layer of useful thickness. The naturally occurring oxide layer that might be present on the ceramic particles is insufficiently thick for this purpose.

Method—Solution Combustion

In a second method, a metal or metal alloy coating on the ceramic particles is established using a solution combustion method. In a solution combustion process, a solution of metal ions with an oxidisable counterion (typically metal nitrates, sulphates, chlorides, carbonates or acetates, e.g. nitrates) is provided with a fuel. That fuel is typically a water soluble organic amine, organic acid or an amino acid. Upon heating, the reaction self sustains to generate a metallic powder. This type of reaction is well known in the art.

In a preferred embodiment, metal-coated ceramic particles of the invention can be prepared by:
(i) suspending ceramic particles in an aqueous solution of a fuel such as glycine and at least on metal salt having an oxidizing counterion to provide a mixture;
(ii) heating the mixture to a temperature below its ignition temperature to remove at least a part of the water such as all of the water;
(iii) heating the mixture to its ignition temperature to provide metal or metal alloy coated ceramic particles;
(iv) spray-drying the metal or metal alloy coated ceramic particles to produce an agglomerated particulate; and
(v) heat treating the agglomerated particulate.

Steps (i)-(iii) define a solution combustion synthesis (SCS). SCS involves self-sustained reactions in a solution of metal containing oxidizers (typically metal nitrates, sulphates, chlorides, carbonates or acetates, e.g. nitrates) and a fuel, e.g, water-soluble linear and cyclic organic amines, organic acids and amino-acids. With an excess of the fuel, metal powder is generated and this forms a coating on the ceramic particles. If there is insufficient fuel, metal oxide powder tends to form and this then forms the coating on the ceramic particles. The combustion reaction is completed within a short time (on the order of seconds) with reaction temperatures reaching up to 1500° C.

It is preferred if the metal used in this process is Ni, Cu, Cr, Co or Fe, e.g. Ni, Cu, or Fe or alloys such as those of Cr, Co, Cu, Fe and Ni, e.g. Ni, Cu or Fe. It is especially preferred to use nickel and/or chromium nitrate as the starting reactant. The fuel is preferably glycine.

In a preferred process, nickel nitrate (e.g. as the hexahydrate (Ni(NO3)2·6H2O) and glycine (CH2NH2COOH) are used. Addition of ammonium nitrate (NH4NO3) as secondary fuel is sometimes preferred to ensure crystalline metal is formed.

In a solution combustion process, the reactants are first dissolved in water. Thus, a metal salt such as a metal nitrate, e.g. a nickel nitrate, a fuel such as glycine and optionally ammonium nitrate are dissolved in water. The relative amounts of the reactants are carefully calculated to ensure the desired outcome (e.g. the desired stoichiometry, sufficient fuel etc).

Ceramic particles as defined in the preceding sections, are added to form a suspension. Other routes to the formation of the starting suspension may also be used. For example, fuel may be added step by step into the suspension after addition of the ceramic particles. Any method can thus be used to form the starting suspension.

Where a metal alloy is desired, a mixture of metal salt reactants can be used rather than a single metal salt.

In one embodiment, the ratios between the dissolved reagents and ceramic particles are selected so as to form a maximum of 30 wt % metal or metal alloy layer upon finishing the process. The fuel and metal salts are preferably added simultaneously.

The suspension comprising the ceramic particles, metal salt reactant(s) and fuel in water can be dried in an oven by heating to below its ignition temperature to remove at least a portion of the water content, ideally all the water content. Following drying, the sample is ignited. Ignition can be achieved by heating the material to above its ignition temperature, which results in a combustion wave which propagates in a self-sustained way along the reaction media. A temperature of 500° C. may be needed to ignite the reaction.

The solution combustion process tends to form nanoparticles of the metal (or metal alloy). These nanoparticles are weakly agglomerated and thus adhere to the ceramic particles to form a porous and loose layer.

The material can be stirred to form slurry for the spray drying step (e.g. in water). During the spray drying, the nanoparticles are easily broken down and distributed homogenously among silicon carbide particles forming a coating layer.

The spray drying step produces agglomerated ceramic powder which is then heat-treated as previously described to allow densification forming powder free agglomerated silicon carbide powder feedstock.

Step (iv) involves the production of an agglomerated particulate. Agglomeration can be achieved through various methods known in the art such as spheroidising, crushing, blending or spray drying. Most preferably the particles formed during step (iii) are agglomerated in step (iv) by spray drying.

In the case where metal oxide is present after the SCS process, i.e. where φ <1 and there is insufficient fuel to cause a reduction of the oxide, an additional step of heating the spray dried ceramic powder in a hydrogen flow atmospheric furnace may be carried out to reduce the oxide into metal or metal alloy.

These particles can then be used for thermal spraying.

Metal Oxide Coating Reduction Method

In an alternative embodiment, metal or metal alloy coated ceramic particles of the invention can be prepared by reduction of a metal oxide layer on the particle. The route to the achievement of that oxide layer is not limited. The metal oxide layer may be introduced by a sol-gel method or introduced via precipitation. In one embodiment, a metal oxide layer is introduced following the disclosure in WO2014/068082.

Thus, in a preferred process, the invention provides:
(i) obtaining metal oxide coated particles of silicon carbide, silicon nitride, boron carbide or boron nitride;
(ii) reducing the metal oxide coating to a metal or metal alloy layer. Ideally, the particles can then be thermally sprayed.

In a preferred process, the invention provides:
(i) obtaining metal oxide coated particles of silicon carbide, silicon nitride, boron carbide or boron nitride;
(ii) agglomerating the coated particles of step (i);
(iii) reducing the metal oxide coating to a metal or metal alloy layer. Ideally, the particles can then be thermally sprayed.

More preferably, the process provides
(i) precipitating one or more metal salts on the surface of a particle of silicon carbide, silicon nitride, boron carbide or boron nitride and subsequently oxidising said precipitated salt(s) to form a layer comprising one or more metal oxides on said particle;
(ii) optionally spray-drying the coated particles to produce an agglomerated particulate; and
(iii) reducing the metal oxide layer to a metal or metal alloy layer.

Any method for the introduction of an oxide coating can be used. It is known, as described in WO2014/068082, that an oxide coating can be introduced onto ceramic particles via calcination and sintering of a precursor coating. A first step therefore involves the production of a metal oxide layer on the ceramic particles. Methods as described in WO2014/068082 are particularly suitable and are described herein.

An oxide precursor coating can be formed via precipitation of at least one metal salt onto the ceramic particle substrate, or via precipitation of at least one metal salt sol onto the ceramic particles. Ideally, there will always be two or more metal salts present however it is possible for one salt to be used. Useful particles can be made with $Y_2O_3$ or MgO as the oxide coating so only one precursor metal salt could be used. In the case of boron carbide, we can use only $Al_2O_3$ so again, only one metal salt need be used.

Thus, in order to introduce an oxide layer onto the ceramic particles this can be effected by calcination of a non oxide coating. The metal salt used therefore is preferably not an oxide. In some embodiments a hydroxide or carbonate (or ideally a mixture of hydroxide/carbonate) precursor coating on the particles may be suitable. When the precursor coating is calcined in the presence of oxygen, this converts to an oxide coating.

The provision of a metal hydroxide and/or carbonate coating or other salt based coating onto the ceramic particles can be achieved via co-precipitation of metal salt precursor onto the particles or via precipitation of metal salt sol onto the ceramic particles or via spray drying of an appropriate mixture.

Thus, it is preferred if the ceramic particles are contacted with 5 to 50 wt %, preferably 7.5 to 40 wt %, such as 10 to 35 wt %, especially 11 to 30 wt % of a metal salt(s) or metal salt sol. In some embodiments there should be more than 10 wt % of the metal salt(s) or metal salt sol present. Thus if there is 1 g of ceramic particles (solids in any carrier medium) 40 wt % of metal salts represents 400 mg.

The metal in the salt or salts used in this method are those discussed above. The use of Al and Y is especially preferred.

The counterion is preferably not an oxide but is a counterion that can preferably be converted to hydroxide or carbonate (if necessary) and then to an oxide during the process of the invention. Preferred counter ions are therefore nitrates, halides, sulphates, sulphides and nitrites. A hydroxide or carbonate can also be used directly. The use of nitrates is especially preferred.

In order to ensure a successful coating operation, the salt is preferably one that deposits on the ceramic particles as a hydroxide or carbonate during the coating process or at least converts to such a hydroxide or carbonate during the coating process. The presence of a hydroxide or carbonate precursor coating is the key to the subsequent formation of an oxide coating.

In a further more preferred embodiment, it is preferred if a mixture of metal salts is used as an oxide coating precursor. In particular, the use of two different salts is preferred. Where two salts are used, it is preferred if the metal ions are different. It is also preferred if the two counterions are the same. Thus, the use of two different metal nitrates is especially preferred.

Metal salt(s) of interest are preferably soluble in the solvent used during the process, especially water soluble.

Highly preferred metal salts of use in the invention are $Al(NO_3)_3$, (gives $Al_2O_3$), $Y((NO_3)_3$ (gives $Y_2O_3$). In particular, salts may be hydrates. Preferred salts are $Al(NO_3)_3 \cdot nH_2O$; $Y(NO_3)_3 \cdot nH_2O$; $AlCl_3 \cdot nH_2O$; $YCl_3 \cdot nH_2O$; $Y_2(CO_3)_3 \cdot nH_2O$.

Ideally, when two metal salts are present, the combination of the metal salts may form a eutectic of metal oxides after calcination. Thus, the amount of metal salts added to the ceramic can be carefully measured such that a eutectic system is formed. A eutectic system is a mixture of chemical compounds or elements that has a single chemical composition that solidifies at a lower temperature than any other composition made up of the same ingredients. In this field, the person skilled in the art is aware of certain combinations of metal salts that form eutectics. For example, the use of certain proportions of aluminium nitrate and yttrium nitrate forms a eutectic of yttrium aluminium garnet after calcination (YAG, $Y_3Al_5O_{12}$).

In a first embodiment, metal oxide precursors are introduced onto the ceramic particles via co-precipitation. Metal salt(s) precursor co-precipitation may be performed by mixing the ceramic particles with the precipitator compound(s) in an aqueous suspension, such as one containing 3 to 10 wt % of solid contents, preferably about 5 wt %. The suspension can be stirred to breakdown any agglomerates and to homogenize and disperse the ceramic particles.

The mixed suspension may then be heated to 50° to 100° C., preferably about 90° C. to assist the precipitation process. The eutectic metal salt(s) solution can be delivered into the mixed suspension in any order. However, a reverse titration method where the eutectic salts are added in a controlled order is preferred. The use of a precipitator compound is preferred to ensure activation of a hydroxide or carbonate precipitation that ideally forms a coating onto silicon carbide particles during the process.

Alternatively, the metal salts, precipitator and particles can be combined and spray dried in order to introduce a coating onto the particles, in particular where a weak acid is used as the precipitator. Spray drying may provide more spherical particles and hence allow better flowability.

Thus, the key to a successful coating operation is the presence of a "precipitator" compound which enables precipitation of the metal salts onto the ceramic particles. This compound is a weak acid or a weak base. The precipitator compound can be present in a molar amount of around 1 to 30 times, preferably 3 to 30 times such as 5 to 30 times the molar amount of metal salt(s) present, preferably 6 to 20 times, especially 5 to 10 times, such as 8 to 10 times.

Where a weak acid is used, the molar ratio of precipitator to total metal cation is preferably 1 to 3. Where a weak base is used, an ideal molar ratio of precipitator to total metal cation is 6 to 8.

In some embodiments, it is preferred that the amount of precipitator compound present is such that the pH of the mixture is basic, e.g. pH 9-11. Ideally, during the coating process, the pH of the suspension is 9 or more when a weak base is employed as the precipitator. When a weak acid is used, pH values as low as 1 to 2 can be employed.

Precipitator compounds of interest are weak acids such as alkanoic acids (ethanoic acid, methanoic acid), HF, formic acid and organic acids such as citric acid. The use of citric acid is especially preferred. Alternatively, preferred compounds are weak bases such as ammonium hydroxide, alkylamines, but in particular urea, ammonia solution and hydrogen carbonates such as ammonium hydrogen carbonate. Ideally, the precipitator compound is water soluble. The use of urea or ammonium hydrogen carbonate is especially preferred.

When particles are spray dried, it is preferred that the precipitator compound is a weak acid such as citric acid as this gives the best final agglomerated SiC powders compared to when a weak base is used.

In another embodiment, the metal oxide coating is produced via precipitation of a metal salt sol such as a hydroxide sol. The ceramic particles are mixed with the metal salt sol to form a mixed suspension, such as one containing total solid loading of 3 to 20 wt %, such as 3 to 10 wt % of the ceramic particles, such as about 5 wt % or 10 wt % of ceramic particles. The solvent is preferably water. Stirring can again be used to homogenize the suspension. The precipitator compound is then added in controlled order, preferably using titration to assist precipitation of metal salt sol layer onto the ceramic particles. The heating of the mixed suspension and control of the pH are part of the process that defines the successful metal salt sol precipitation. It is preferred to heat the suspension in between 50° to 100° C., preferably about 90° C. to assist the process. The pH can be maintained at levels of lower than 2 if a weak acid is used or 9 or more, such as 9 to 11 if a weak base is used.

Preferred metal sol precursors are inorganic metal salts or metal organic compounds such as metal alkoxides, boehmite [AlO(OH)] or basic yttrium carbonate [Y(OH)CO$_3$].

The amount of deposition is a function of the amount of metal salts or metal salt sol added according molar ratio to weight percentage calculation. More salt(s) in the system gives a thicker coating.

This process can take place at ambient temperature. However, the temperature of precipitator activation is preferably from 50° C. to 100° C. For ammonium hydrogen carbonate a temperature of about 50° C. is preferred. For urea and citric acid, a preferred temperature is about 90° C. Also, the pressure can be ambient.

It may, however, be necessary to use a dispersant in the mixed suspension to disperse the ceramic particles and avoid agglomeration in the presence of the precipitator and during the addition of the metal salt(s). Conventional organic dispersants can be used. The dispersant is therefore a non reactive surfactant type material.

Without wishing to be limited by theory, the inventors envisage that the precipitator compound causes the starting metal salts such as a nitrate to undergo reaction to for example, corresponding hydroxide and carbonate salts. It may be these salts that deposit on the surface of the ceramic particles and which are converted to the oxide during calcination.

This process therefore allows the formation of a coating such as a hydroxide or carbonate coating on the ceramic particles. As the metal salt(s) are preferably water soluble, it is believed that there will be no free metal salt particles formed in the suspension. Moreover, it is also preferred if the precipitator compound is water soluble. There should therefore be no particles formed from metal salt or precipitator compound.

In one embodiment, a metal sol such as boehmite [AlO (OH)] is used in the precipitation methods or is generated during the precipitation process. Particles such as silicon carbide particles are mixed with metal sol precursor accordingly. The precipitate compound then added with titration, ideally until the suspension pH is between 9 to 11.

In a most preferred embodiment, a mixture of Al(NO$_3$)$_3$+Y(NO$_3$)$_3$ is used in the method of the invention. The molar ratio of these metal salts may be 5:3 as this forms a eutectic and yields yttrium aluminium Garnet (YAG) upon calcination and sintering.

Once coating has occurred the particles can be filtered from the rest of the suspension and the particles are dried, preferably spray dried using conventional lyophilisation processes. The coated particles which form at this stage of the proceedings tend to agglomerate and can have particle sizes of 10 microns or more, such as 15 microns or more, such as 20 to 50 microns.

The formation of an agglomerated particulate can also be achieved through various methods known in the art such as spheroidising, crushing, blending or spray drying. Most preferably the coated particles are agglomerated by spray drying.

Where a hydrogen carbonate precipitator is used, it is preferred if the particles are spray dried although conventional oven type drying is also possible. Where however a urea precipitator is used, the coated particles are preferably oven dried before further treatment (such as calcination, sintering, sieving etc).

The co-precipitation process using AHC can be spray-dried directly after the titration process without filtering. However, when a urea precipitator is used, it is preferred if filtration occurs and the filtrate combined with fresh distilled water (and optional PVA and PEG addition). The solid content can be increased up to 20 to 40 wt % to reduce drying cost.

The coated particles are then calcined. Calcination can occur at conventional temperatures and using conventional techniques. A temperature of 400 to 800° C. is preferred such as 500-600° C. A temperature of 800 to 1200° C. is also possible such as 900 to 1000° C. but is less preferred. The process takes place in the presence of air to ensure oxidation of the hydroxide to an oxide coating.

After calcination, the particles can be sintered. The sintering of oxide coated SiC particles preferably takes place under argon atmospheric furnace with temperature up to 2000° C. such as up to 1750° C. Ideally sintering takes place at a temperature of 1000° C. to 2000° C., such as 1300 to 1800° C.

Particles sizes are again around 20 to 100 microns at the end of the calcination and sintering process.

It is envisaged therefore that metal oxide coated ceramic particles of the invention will comprise at least 5 wt %, such as at least 10 wt %, preferably at least 20 wt % of the oxide coating. The oxide coating ideally forms 11 to 40 wt % of the coated ceramic particles as a whole or 10 to 30 wt %. The coating wt. % on the SiC particles can be quantitatively calculated based on the XRD pattern using Rietveld method.

The thickness of the particulate oxide coating on the ceramic particles may preferably be in the range of 50 to 200 nm. It is generally observed of course that thicker coatings may be present on larger particles.

The inventors envisage that the coating will form a complete coating around the ceramic particle. Any break in the coating could offer potential for decomposition. Our coating can therefore be considered continuous. That said, even if there is a possibility that the oxide coating may break down, perhaps during the manufacturing process or thermal spraying process, the desired result can still be achieved. During the thermal spraying process, the coating melts. The coating can therefore cover up any breaks in the coating whilst bonding together layers of the spray coating material.

It will be appreciated that after spray drying and before calcination and sintering some binders (additives) might be present as is known in the art to ensure successful spray drying processes. Polyvinyl alcohol (PVA) might be added to assist agglomeration to create round shaped powder. PEG might be added to increase the flowability of suspension preventing the clogging of the spray-drying nozzle and allowing easy transfer of the spray-dried powder and so on.

The process of the invention leads to the formation of agglomerated and sintered ceramic powders containing, inter alia, yttrium aluminium garnet coated on each ceramic particle.

The particles of ceramic having a metal oxide coating are then subjected to a reducing atmosphere to convert the metal oxide coating to a metal coating.

Reduction of the Metal Oxide

Reduction of the metal oxide is preferably achieved simply by heating the particles in a furnace in the presence of graphite or H2 gas at temperatures below the melting point of the metal or metal alloy, but it is preferably achieved by subjecting the particles to hydrogen gas.

Thermal Spraying

The metal or metal alloy-coated ceramic particles can be thermally sprayed onto a substrate. Various thermal spray techniques could be used such as those based on combustion (e.g. flame spraying or HVOF), detonation (detonation gun or high frequency detonation gun) or electrical/plasma spraying (atmospheric plasma spraying, low pressure plasma spray or vacuum plasma spray). Preferred spraying techniques involve a high frequency detonation gun, an HVOF technique or atmospheric plasma spray. These techniques are well known and a complete summary of them is not required here.

The use of a high velocity oxy-fuel (HVOF) gun is preferred. HVOF spraying involves a mixture of gaseous or liquid fuel and oxygen which is fed into a combustion chamber, where they are ignited and combusted continuously. The resultant hot gas at a pressure close to 1 MPa emanates through a nozzle and travels through a straight section. The jet velocity at the exit of the barrel (>1000 m/s) exceeds the speed of sound. The feed stock is injected into the gas stream, which accelerates the powder up to 800 m/s. The stream of hot gas and powder is directed towards the surface to be coated. The powder partially melts in the stream, and deposits upon the substrate.

In the case of the detonation system, the use of a high frequency pulse detonation gun is preferred and is explained in detail in U.S. Pat. No. 6,745,951. A detonation gun for thermal spraying consists of a combustion chamber and a barrel, with entrances for fuel and for oxidizer. It is also provided with one or more spark plugs for detonating the fuel-oxidizer mixture and one or more injectors for the introduction of the product into the barrel.

In plasma spraying processes, the material to be deposited is introduced into the plasma jet, emanating from a plasma torch. In the jet, where the temperature is on the order of 10,000 K, the material is melted and propelled towards a substrate. There, the molten droplets flatten, rapidly solidify and form a deposit.

The substrate onto which the coated particles are thermally sprayed is not limited and can therefore be any substrate of interest to the skilled person. The present inventors have particular interest in spraying the particles onto metallic substrate materials such as carbon steel, stainless steel, Ni super alloys, aluminium, etc. However composite material substrates, like ceramic matrix composite (CMC) or carbon matrix composite are also of interest. Spraying onto ceramic and polymeric substrates is also possible.

The coating thickness on the substrate can vary depending on the thermal spray parameters and system. Thicknesses from 10 to 1000 microns, preferably 100 to 300 microns, are possible. It will be appreciated that multiple deposition processes may be required to achieve thicker coatings.

The coatings formed on the substrate have excellent wear and corrosion resistance properties. In general the as-sprayed coatings are rough (Ra=4.2 micron). To improve performance for wear applications, it may be necessary to machine the surface of the as-sprayed parts until the surface reaches the desired surface roughness by methods, such as grinding, polishing, lapping, etc.

In order to maximise the efficiency of the thermal spraying process, it might be necessary to prepare the substrate surface for coating. The substrate surface should be clean. It might also be blasted with grit or the like to create a rough surface that helps adhesion of the coating during thermal spraying.

The invention will now be further described with reference to the following non limiting examples.

Example 1

1. Electroless Ni Method
Pretreatment:
a. To clean and activate the surface thus allowing SiC to be in contact with nickel metal, which will eventually adhere and start to grow.

Treated using a mixture solution of 0.5 g benzotriazole to 0.5 L deionized water+20-30 ml HF (40%) and 60-70 ml Nitric Acid (65%) for 30 min.

b. To activate the surface of the SiC where nickel metal can adhere and start to grow during electroless nickel plating.

treated using 20% KOH solution for 30 minutes at 80 C treated using 20% NaOH solution 30 minutes at 80 C The SiC particles are dispersed in these solutions and ultrasonic wave or stirring using magnetic bar are utilized. After 30 minutes, the solution is filtered to collect the treated SiC particles.

Sensitization and Activation:

Sensitization was achieved by treating the SiC particles with aqueous $SnCl_2$ (10 g/L)+HCl (30 ml/L) at 40° C. for 15-30 minutes.

Activation was achieved by treating the SiC particles with aqueous $PdCl_2$ 0.25 g/L+HCl (3 ml/L) at 40° C. for 15-30 minutes.

Electroless Nickel Process
a. Formula

Figure 2:
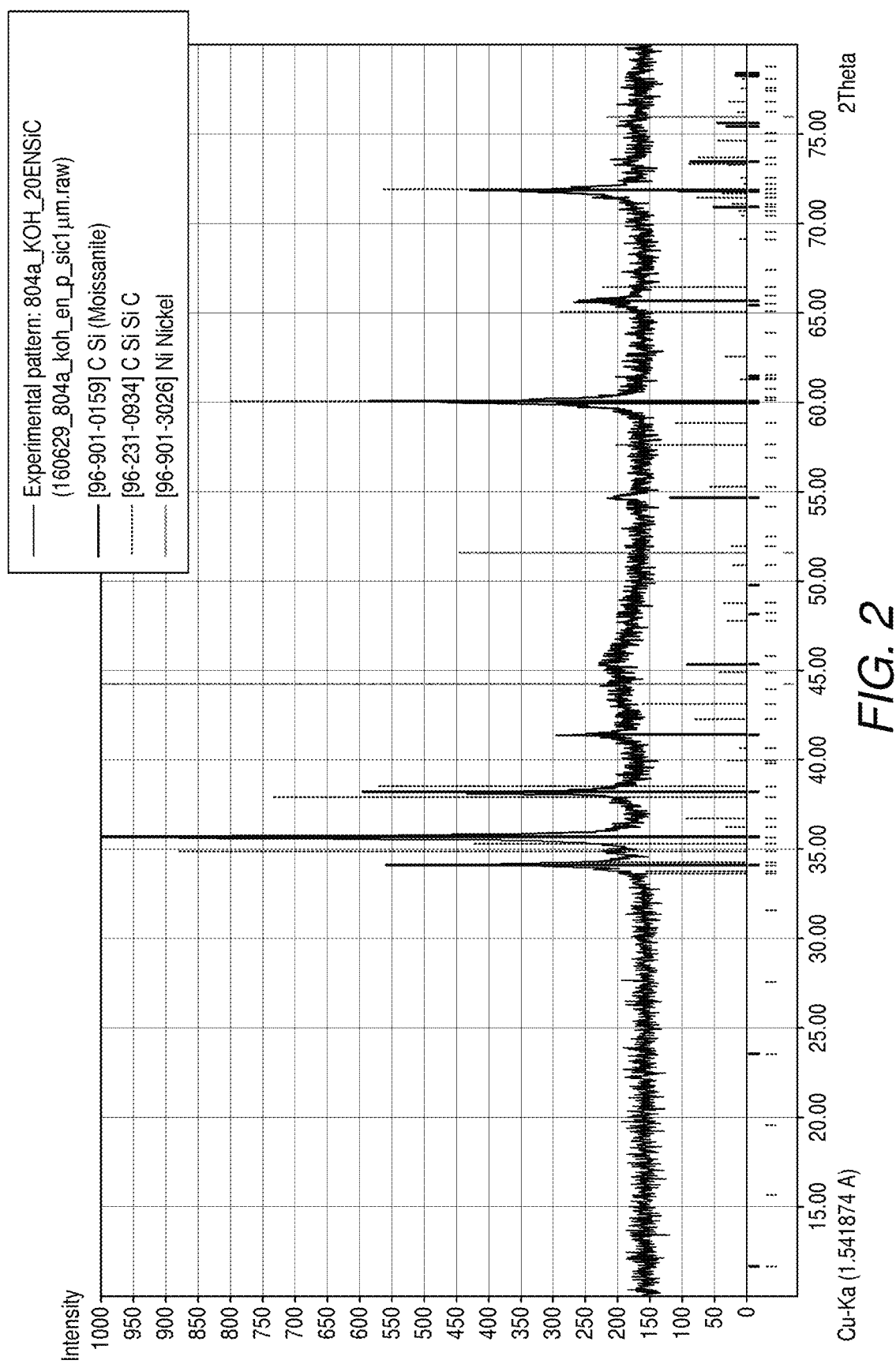
FIG. 2 illustrates XRD peaks observed for SiC particles (0.8 μm average size) which have undergone a pre-treatment step with 20 wt % KOH for 30 min at 80° C., followed by electroless nickel plating.

| Chemicals | Formula | Concentration (g/L) | Molarity |
| --- | --- | --- | --- |
| Nickel Sulphate | NiSO4•6H2O | 25 | 0.100 |
| Sodium hypophosphite | NaH2PO2 | 20 | 0.190 |
| Sodium citrate | Na3C6H5O7•2H2O | 20 | 0.080 |
| Sodium acetate | NaAc | 5 | 0.060 |
| Sodium hydroxide | NaOH | pH adjustment | — | b. Parameters:
Stirring: 300 rpm
Temperature: 80° C.
pH: 10
time: 60-120 minutes Results:
a. Electroless nickel plating of SiC particles (0.8 μm average size) without any pre-treatment result are shown in FIG. 1. Nickel metal is observed.
b. Electroless nickel plating of SiC particles (0.8 μm average size) having undergone pre-treatment with a solution of 20 wt % KOH for 30 min at 80 C are shown in FIG. 2. Nickel metal is observed.

Example 2: Plasma Spray Coating

Figure 3:
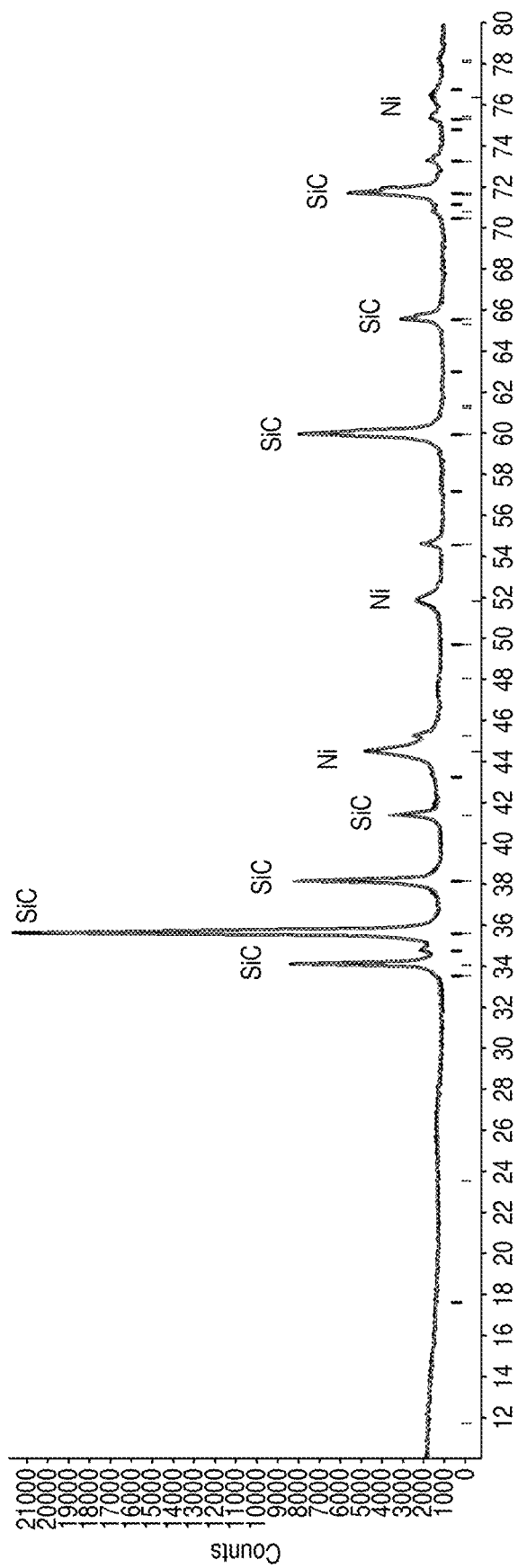
FIG. 3 illustrates XRD peaks observed for SiC particles (0.8 μm average size) which have undergone a combustion process without any pre-treatment.
Figure 4:
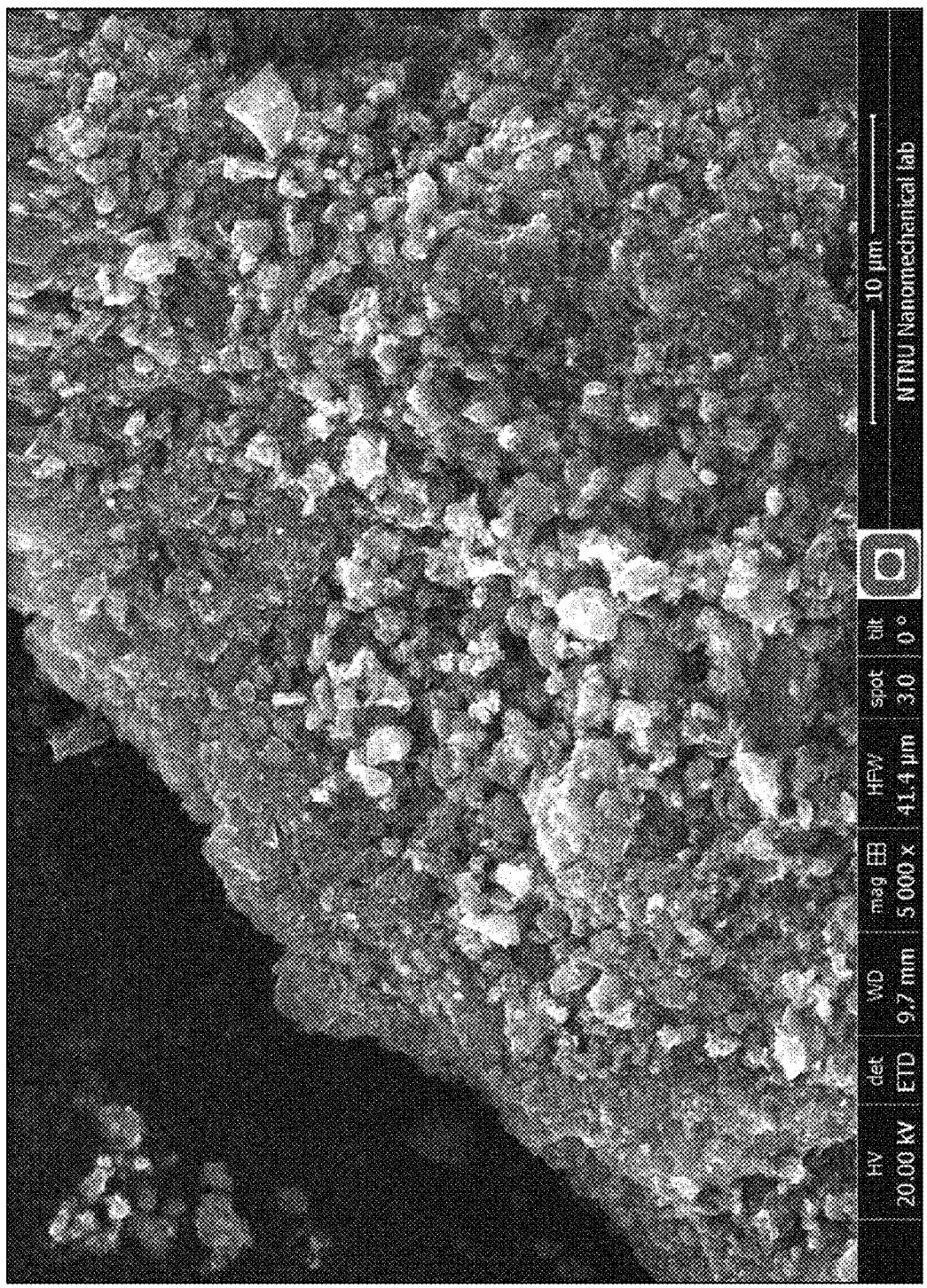
FIG. 4 illustrates an agglomerated powder particle consisting of SiC coated with Ni as presented in the XRD result of FIG. 3.

A powder produced by the combustion process (FIGS. 3 and 4) was plasma sprayed onto a carbon steel substrate with an atmospheric plasma spray gun according to the following parameters:

Gas flow: 40 slpm Ar plus 12 slpm H2 (SLPM=standard litres per minute)
Intensity: 600 A
Distance of the torch from the substrate: 70 mm
Powders feeding with Thermico CPF-2 employ nitrogen carrier gas 20 SLPM and feeder disk 10 rpm rotation.
Number of torch scan on substrate: 4×6 second.

Figure 5:
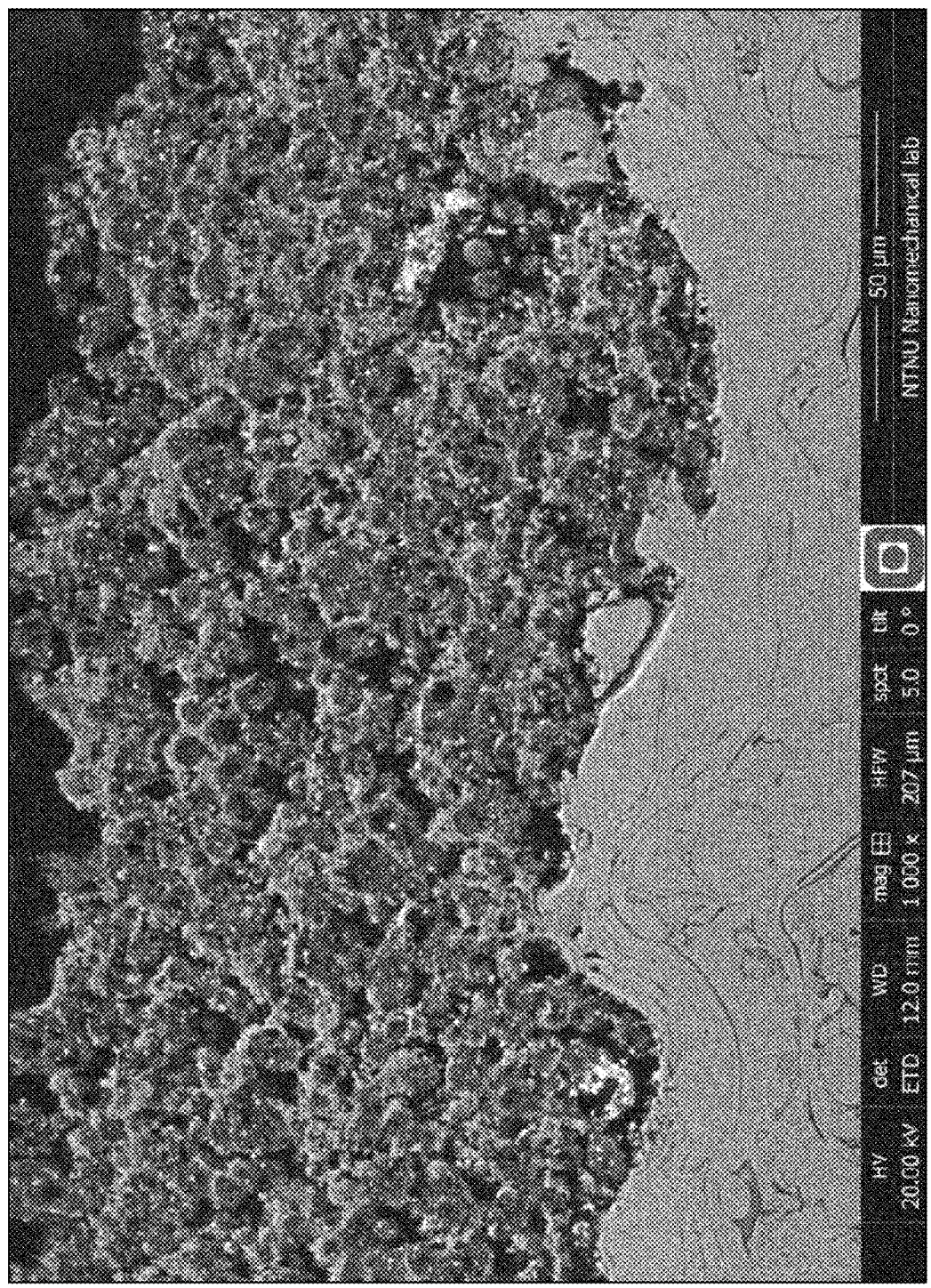
FIG. 5 is the product of atmospheric plasma spray coating of the powder showed in FIG. 4.
Figure 6:
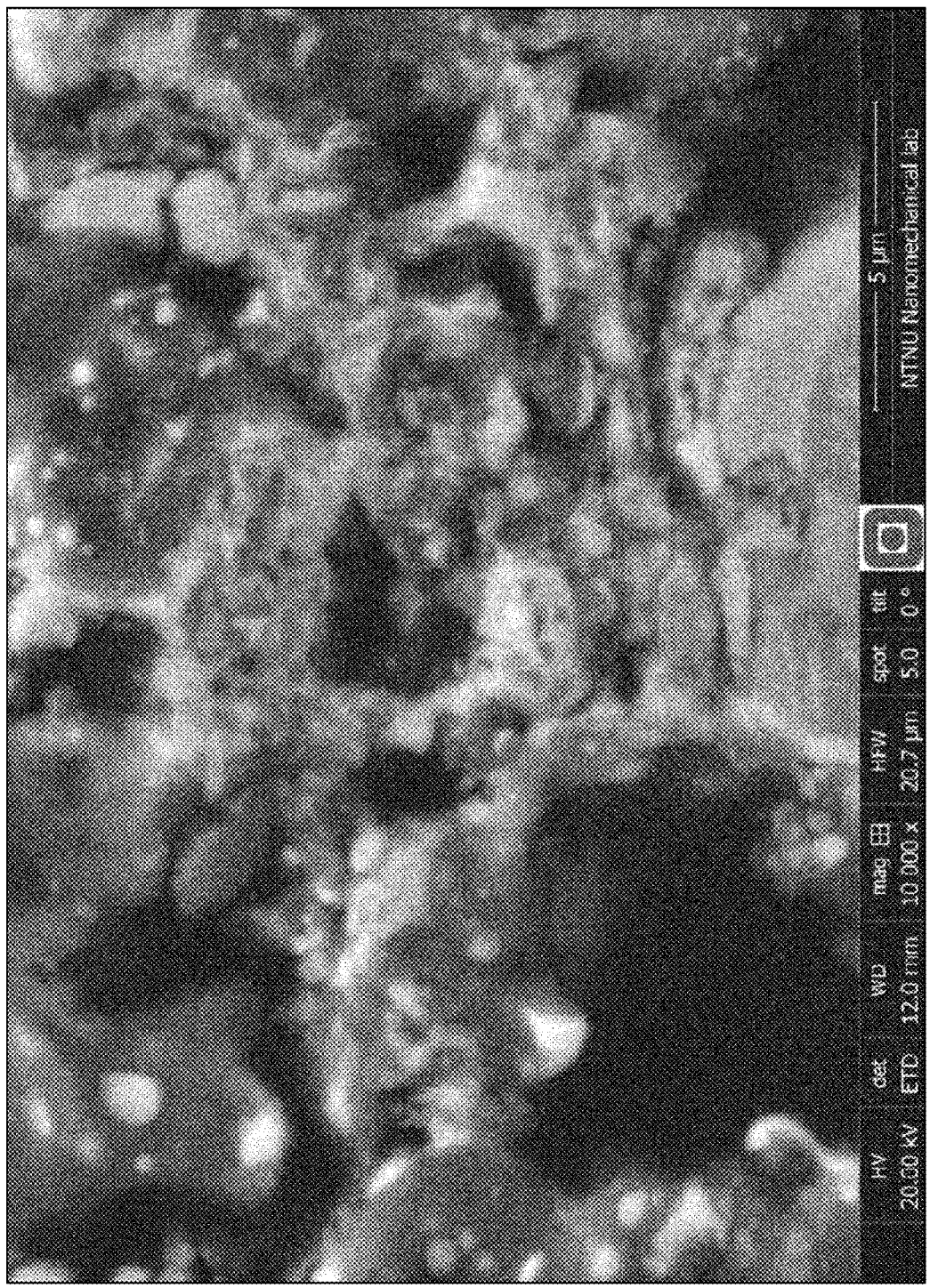
FIG. 6 shows the detail of the coating prepared in FIG. 5. In this detail the SiC particles (black contrast) embedded in the Ni matrix (white contrast) are visible.

At the end of the deposition, the coating samples were characterized with a scanning electron microscope. The micrograph of the coating cross section is performed resulting in the structure as shown in FIG. 5. The typical structure where the metal matrix (show as brighter area) are surrounding silicon carbide (show as darker area) as expected from the coating deposition produced with these powder feedstocks. Large amounts of pores are also clearly visible in the micrograph and are characteristic of a plasma spray method.

The invention claimed is:

1. A composition comprising an agglomerate of metal or metal alloy coated particles, said particles comprising:
   (i) 50-95 wt % of an inner core of silicon carbide, silicon nitride, or boron carbide; and
   (ii) 5-50 wt % of an outer layer of a metal or metal alloy, wherein said agglomerate has an average particle size in the range of 10 μm to 100 μm.

2. A composition as claimed in claim 1 wherein the metal or metal alloy is a $1^{st}$ row transition metal or $1^{st}$ row transition metal alloy optionally with B or Si.

3. A composition as claimed in claim 1 wherein the outer coating (ii) of said particles is selected from the group consisting of: Ni, NiCo, NiCr, NiSi, FeSi, CoSi, NiTiCr, NiTiCrBSi, NiB, Co, CoCr, Fe, and FeCr.

4. A composition as claimed in claim 1 wherein the average thickness of the metal layer on said particles is in the range of 50 nm to 300 nm.

5. An article comprising a coating, wherein the coating comprises the composition of claim 1.

6. A process for producing a coated substrate comprising thermally spraying the agglomerated metal or metal alloy coated particles of claim 1 onto a substrate to provide a coating thereon.

7. A process as claimed in claim 6 wherein the layer of metal or metal alloy formed on the ceramic is Ni or a Ni-alloy.

8. A process as claimed in claim 6 wherein the agglomerated particulate formed after step (iii) has an average agglomerated particle size of 10 to 200 μm, or 10 to 100 microns.

9. A process as claimed in claim 6 wherein the particle comprises SiC.

10. A process as claimed in claim 6 in which the substrate is metallic, ceramic matrix composite (CMC) or carbon matrix.

11. A process for the production of metal or metal alloy coated particles of claim 1, comprising the steps of:
   (i) treating particles of silicon carbide, silicon nitride, or boron carbide to provide nucleating sites on the surface of the particles;
   (ii) providing a layer of metal or metal alloy on the particles of step (i) to provide metal-coated or metal-alloy coated particles;
   (iii) producing an agglomerated particulate comprising the metal-coated or metal-alloy coated particles; and optionally
   (iv) heat treating the agglomerated particulate.

12. A process as claimed in claim 11 wherein step (i) comprises a stage of removing any oxide layer from the ceramic particles by treatment of said ceramic particles with a strong acid.

13. A process as claimed in claim 12 wherein said acid is HF or a mixture of benzotriazole, HF and nitric acid.

14. A process as claimed in claim 11 wherein step (i) comprises a stage of treating the ceramic particles sequentially with solutions of Sn(II) and Pd(II).

15. A process as claimed in claim 14 wherein step (i) comprises a first stage (i)(a) of treating the ceramic particles with a charged polyelectrolyte and a second stage(i)(b) of treating the particles from step (i)(a) with a Pd(II) source.

16. A process as claimed in claim 11 wherein step (ii) is carried out by electroless plating of a metal or metal alloy onto the particles formed in step (i).

17. A process for the production of metal or metal alloy coated particles of claim 1 comprising the steps of:
   (i) suspending ceramic particles of silicon carbide, silicon nitride, or boron carbide in an aqueous solution of a fuel and at least one metal salt having an oxidizing counterion to provide a mixture;
   (ii) heating the mixture to a temperature below its ignition temperature to remove at least a part of the water; and
   (iii) heating at least a portion of the mixture to its ignition temperature to provide metal or metal alloy coated ceramic particles;
   (iv) producing an agglomerated particulate of the metal-coated or metal-alloy coated ceramic particles; and
   (v) heat treating the agglomerated particulate.

18. A process as claimed in claim 17 wherein the salt in step (i) is a nitrate, sulphate, chloride or acetate salt.

19. A process as claimed in claim 17 wherein the metal in step (i) is Ni.

20. A process as claimed in claim 17 wherein ammonium nitrate is present in the suspension formed in step (i).

21. A process as claimed in claim 17 wherein step (iii) involves heating at least a portion of the mixture to a temperature in the range of 1000 to 2000° C.

22. A process for producing the composition of claim 1 comprising the steps of:
   (i) precipitating one or more metal salts on the surface of a ceramic particle of silicon carbide, silicon nitride, or boron carbide and subsequently oxidising said precipitated salts to form a metal oxide coating on said ceramic particle;
   (ii) optionally producing an agglomerated particulate of the metal oxide coated ceramic particles; and
   (iii) reducing the metal oxide coating to a metal or metal alloy coating.

23. A process as claimed in claim 22 wherein step (i) is achieved by precipitation of a Ni(II) salt and, in the case of Ni-alloys, co-precipitation of a Ni(II) salt and the salt of another alloying element, onto the ceramic particles.

* * * * *